March 26, 1968  H. ZENHAUSERN  3,374,532
METHOD OF MAKING A WALL-RUNG

Filed Oct. 5, 1962 3 Sheets-Sheet 1

INVENTOR.
HEINRICH ZENHAUSERN

March 26, 1968  H. ZENHAUSERN  3,374,532
METHOD OF MAKING A WALL-RUNG
Filed Oct. 5, 1962  3 Sheets-Sheet 2

INVENTOR.
HEINRICH ZENHAUSERN

March 26, 1968 H. ZENHAUSERN 3,374,532
METHOD OF MAKING A WALL-RUNG
Filed Oct. 5, 1962 3 Sheets-Sheet 3
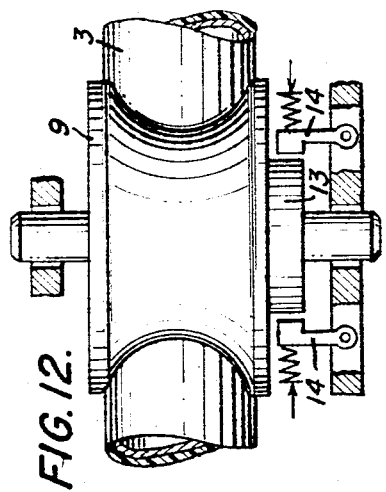
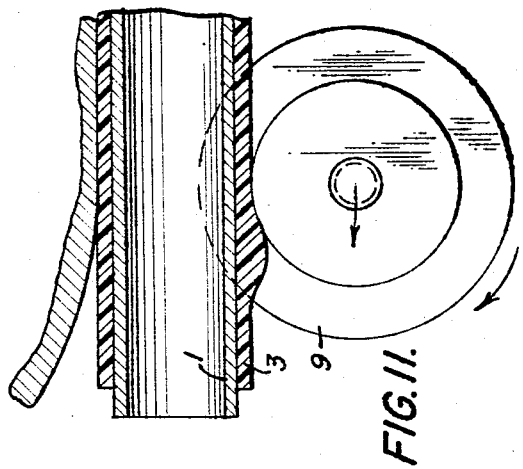
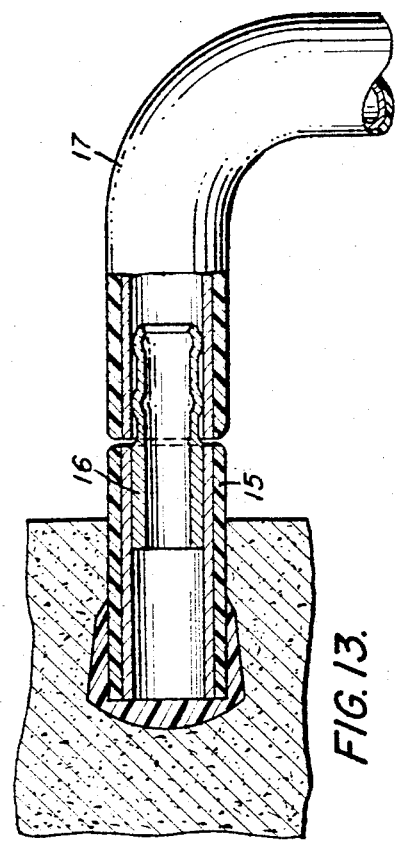
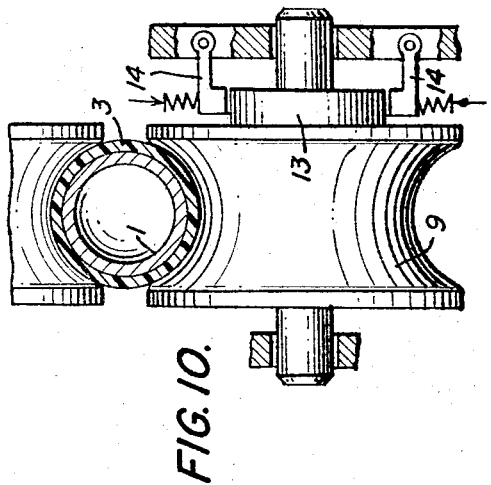
INVENTOR.
HEINRICH ZENHAUSERN

United States Patent Office 3,374,532
Patented Mar. 26, 1968

3,374,532
METHOD OF MAKING A WALL-RUNG
Heinrich Zenhausern, Birmensdorferstrasse 134,
Urdorf, Switzerland
Filed Oct. 5, 1962, Ser. No. 228,521
3 Claims. (Cl. 29—505)

The present invention relates to a process for making a wall-rung. Such wall-rungs are in common use in canal workings, in mine-shafts, dams and reservoirs as also on chimneys and towers of all types, both on the inside and on the outside of same.

The procedure for the making of the wall-rung consists in loosely mounting a sleeve of some synthetic material, preferably with a polyethylene base, in the cold state, on a tube, and then, by subsequent stretching, causing this sleeve to firmly grip the tube. The stretching of the sleeve is effected preferably at the same time as the tube is bent to shape.

The distinctive feature of the wall-rung made on this process is that it is covered with a sleeve of some synthetic material.

The invention will now be described further, by way of example, with reference to the accompanying drawings in which:

FIG. 1 shows a steel tube with a sleeve of synthetic material drawn on,

Figure 2:
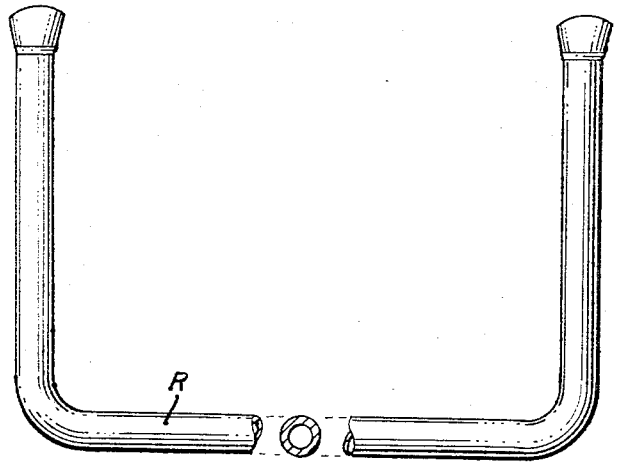
FIG. 2 is a plan view of a wall-rung.
Figure 3:
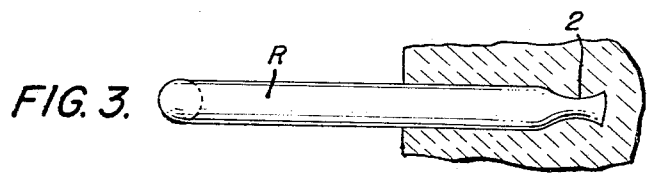
FIG. 3 is a side elevation of the wall-rung shown in FIG. 2.
Figure 4:
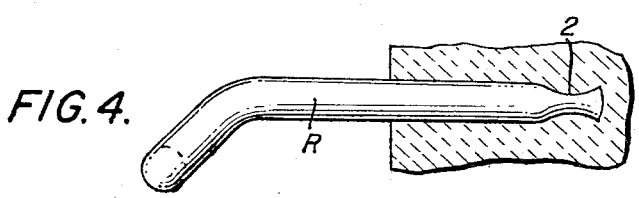
Figure 5:
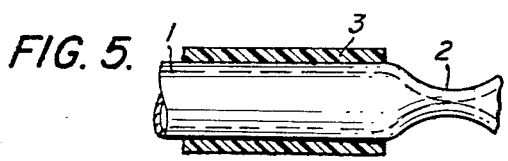
Figure 6:
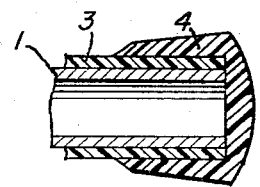
Figure 1:
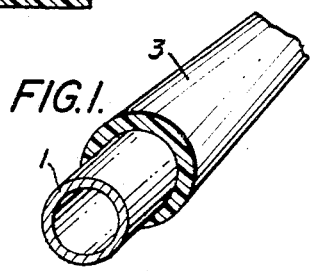
Figure 7:
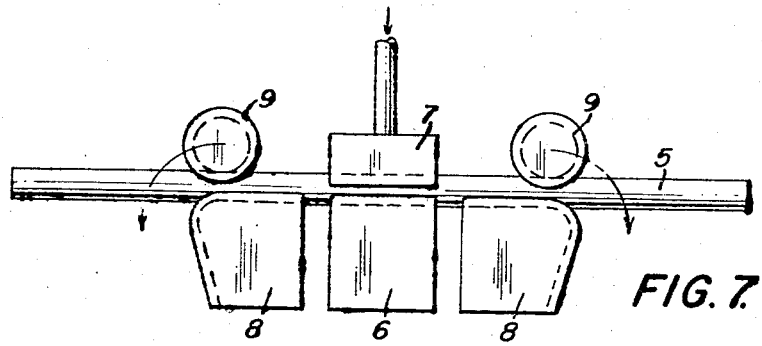

FIG. 4 is a view similar to that of FIG. 3 showing a modified form of wall-rung, FIG. 5 is an enlarged sectional view of a wall-rung in position in a wall, FIG. 6 shows an alternative mounting arrangement to that shown in FIG. 5, FIGS. 7 to 9 show various stages in the making of the wall-rung, FIG. 10 is a detail of the arrangement for bending the tube, FIG. 11 is a plan view corresponding to FIG. 10, FIG' 12 is a side elevation corresponding to FIG. 10, and FIG. 13 shows an enlarged view of the anchoring of one end of the wall-rung.

A steel tube 1 is used for making the wall-rung, this tube being cut to the correct, full length of the rung. The ends of the steel tube are shaped to form a means of fixing 2 in a wall.

A polyethylene sleeve 3 is drawn over the steel tube, this being put on in the cold state. This sleeve is then stretched, causing it to grip the tube tightly. The sleeve is stretched at the same time as the steel tube is being bent into the desired shape. The wall fixing 2 can be dispensed with if a cap 4 is applied to each end of the sleeve, as shown in FIG. 6.

The bending process can be seen from FIGS. 7 to 12. The tube 5, covered with its sleeve, is bent into shape by means of a bending arrangement incorporating a bearer 6 with a block 7 movable at right angles to the tube 5, gripping the bearer 6 and holding it in place. The movement of block 7 can be effected either hydraulically or pneumatically. At each side of the bearer 6, and movable along the length of the tube 5 shaping components 8 are provided; shaper rollers 9 work in conjunction with the shaping components 8. The bending of the tube 5 is effected as follows:

First the tube 5 is held firmly in place on the bearer 6 by means of block 7, the shaper rollers 9 being lightly pressed on the bearer 6 and moving in conformity with the radii of the shaping components 8. By this means not only is the steel tube bent into shape but at the same time the synthetic sleeve on this tube is stretched. This stretching of the tube causes it to grip tightly on the steel tube.

Figure 8:
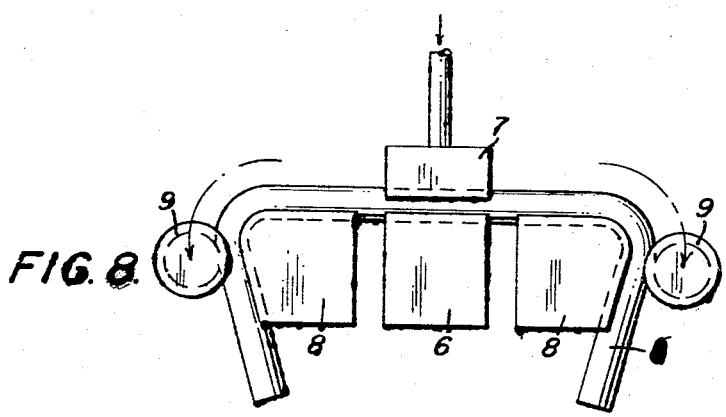
Figure 9:
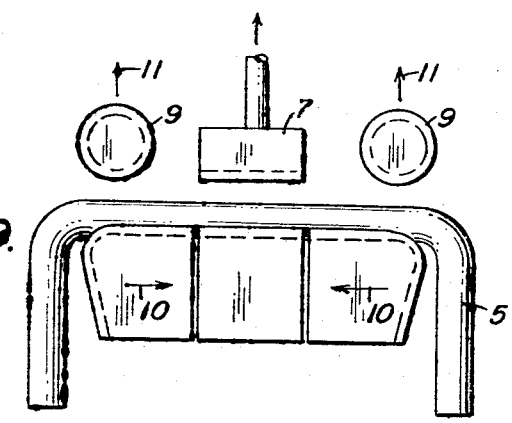

As can be seen from FIGS. 8 and 9, the tube is bent to rather more than the angle desired, so that, when the ends of the tube spring back, it assumes the prescribed shape.

To facilitate and to permit of, the removal of the finished wall-rung, the shaping components 8 are moved in the direction of the arrows 10, whereupon they assume the position as shown in FIG. 9. At the same time the shaper rollers 9 and the block 7 are raised away from the tube, in the direction of the arrow marked 11.

FIGS. 10, 11 and 12 show a shaping roller in closer detail. It will be apparent from these drawings that the roller 9 stretches the resilient sleeve or covering 3 mounted on tube 1, and in so doing, makes it, as it were, into a sausage. To increase this effect still further, the shaping roller 9 is fitted with a brake drum 13 against which a brake block 14 can be pressed.

In conclusion reference is made to the alternative arrangement of the wall-rung shown in FIG. 13. Here the wall-rung is made in two parts, the ends 15, inserted in the wall, being provided with plugs 16 which are inserted into the wall-rung proper 17. One end of each of the plugs 16 is fixed in the inside of one of the tube ends 15, the other end of each being shaped in such a way as to hold the wall-rung firmly in position. In the case of a wall-rung of this type, it is a very simple matter to replace the wall-rung proper 17.

What I claim is:

1. A method of making a wall-rung from a metal tube covered with a sleeve of synthetic material comprising the steps of loosely mounting the sleeve in a cold state on the tube, holding the tube and sleeve at the middle between the ends thereof, and bending the tube into a wall-rung shape and at the same time lengthwise stretching the sleeve to cause the same to grip the tube.

2. A method of making a wall-rung as set forth in claim 1, comprising the step of, during the stretching of the sleeve, exerting rolling pressure against the sleeve and urging the sleeve outwardly from the middle toward the ends of the tube.

3. A method of making a wall-rung as set forth in claim 2, comprising the step of, during the stretching of the sleeve, inducing a braking action on the rolling pressure exerted against the sleeve while the sleeve is being stretched and the tube shaped.

References Cited

UNITED STATES PATENTS

| 1,479,936 | 1/1924  | Stevens       | 264—339 X |
| 1,602,165 | 10/1926 | Parker        | 264—339 X |
| 1,603,297 | 10/1926 | Siddall       | 264—339 X |
| 2,828,537 | 4/1958  | Pischke et al.| 29—517    |
| 2,974,400 | 3/1961  | Sowa          | 29—528 X  |
| 3,076,262 | 2/1963  | Rappleyea et al.| 29—525 X|
| 2,064,803 | 12/1936 | Grove         | 182—90    |
| 2,179,412 | 11/1939 | Keuthan       | 182—90    |
| 2,215,129 | 9/1940  | Morris        | 182—90    |
| 1,913,171 | 6/1933  | Schaefer      | 29—551    |
| 1,959,744 | 5/1934  | Stein         | 29—551    |
| 2,633,626 | 4/1953  | Danforth      | 29—551    |

CHARLIE T. MOON, Primary Examiner.

FRANK B. SHERRY, Examiner.

R. P. MACHADO, Assistant Examiner.